United States Patent [19]

Hyatt

[11] 4,420,106
[45] Dec. 13, 1983

[54] METHOD OF AND APPARATUS FOR DAMAGE-FREE SCORING OF REFRACTORY MATERIAL

[75] Inventor: Charles J. Hyatt, Cheswick, Pa.

[73] Assignee: PPG Industries, Inc., Pittsburgh, Pa.

[21] Appl. No.: 289,590

[22] Filed: Aug. 3, 1981

[51] Int. Cl.³ .................. C03B 33/02; B26D 3/08; B26F 3/00
[52] U.S. Cl. ............................ 225/2; 83/880; 83/886; 225/96
[58] Field of Search ............... 83/880, 881, 886, 863, 83/14; 225/2, 96.5, 96

[56] References Cited

U.S. PATENT DOCUMENTS

| | | | |
|---|---|---|---|
| 3,122,953 | 3/1964 | Atkeson | 83/7 |
| 3,244,337 | 4/1966 | Curtze et al. | 225/2 |
| 3,532,260 | 10/1970 | Augustin et al. | 225/2 |
| 3,865,293 | 2/1975 | Ernsberger et al. | 225/2 |
| 3,865,673 | 2/1975 | DeTorre | 161/1 |
| 3,979,243 | 9/1976 | DeTorre | 156/109 |
| 4,027,562 | 6/1977 | Bonaddio | 83/8 |
| 4,057,184 | 11/1977 | Michalik | 225/2 |
| 4,102,227 | 7/1978 | Simko | 83/7 |
| 4,137,803 | 2/1979 | Goldinger | 83/881 |
| 4,213,550 | 7/1980 | Bonaddio | 225/2 |

OTHER PUBLICATIONS

"Analysis of Brittle Tensile Fracture of Glasses by Ultrasonics", by Frank Kerkhof, Physical Institute of the University of Freiberg, Germany, Apr. 1960.

Primary Examiner—Frank T. Yost
Attorney, Agent, or Firm—Lee Patch; Donald Carl Lepiane

[57] ABSTRACT

A damage-free score, e.g., a subsurface score, in a moving refractory piece, e.g., glass, is initiated by imparting vibrations to a damage-free scoring wheel. The damage-free score is increased in depth by the continual impartation of the vibrations during the damage-free scoring of the piece.

13 Claims, 4 Drawing Figures

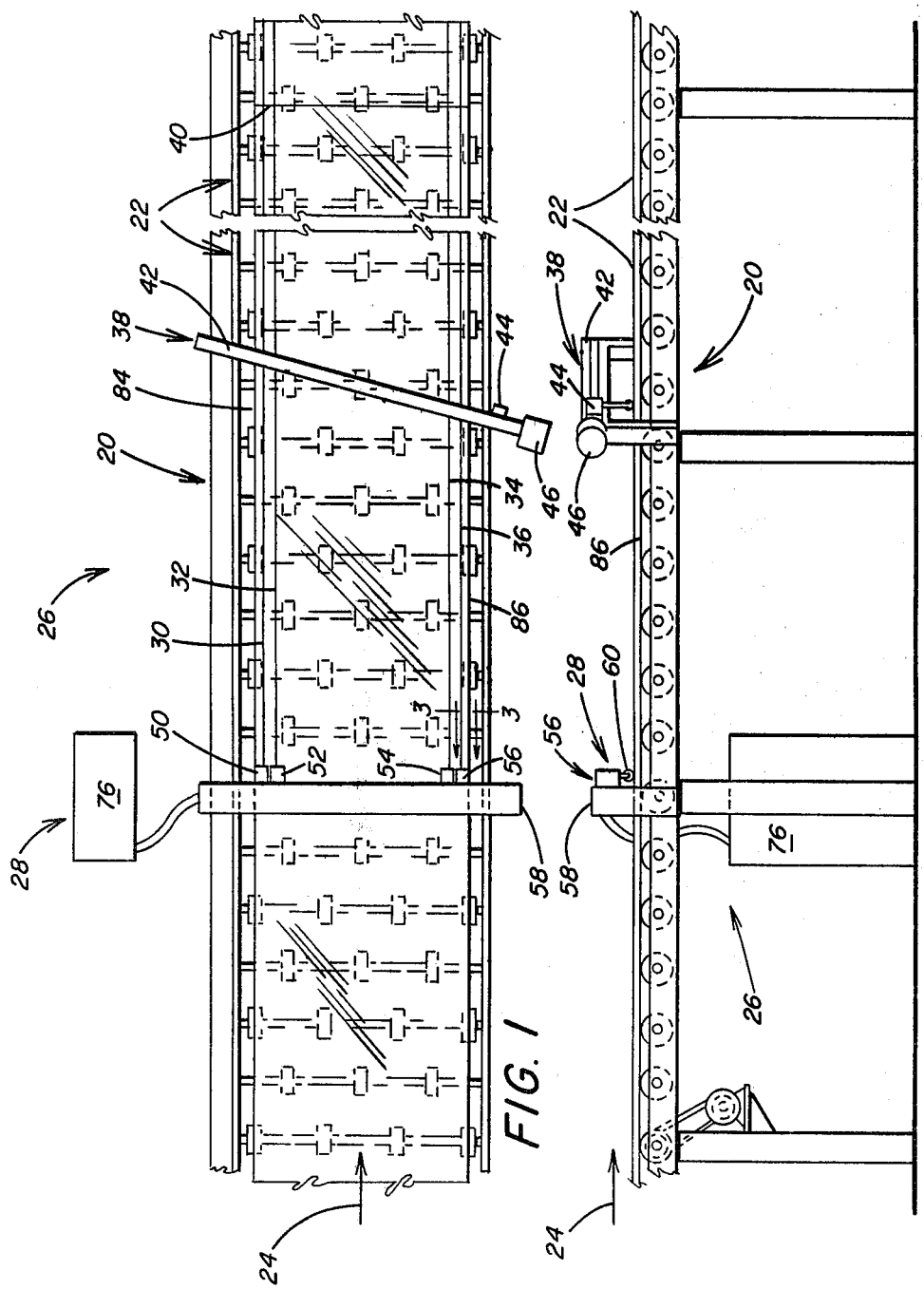

METHOD OF AND APPARATUS FOR DAMAGE-FREE SCORING OF REFRACTORY MATERIAL

FIELD OF THE INVENTION

This invention relates to methods of an apparatus for providing a damage-free score in a piece of refractory material, and more particularly, to the utilization of vibrations to initiate and deepen subsurface and/or pseudosubsurface scores in the piece.

DISCUSSION OF THE TECHNICAL PROBLEM

Various techniques are known for scoring a piece of refractory material. For example, U.S. Pat. No. 3,122,953 to Atkeson teaches an apparatus and method for cutting glass in which a cutting wheel having a V-shaped scoring edge is utilized to impose a score in a piece of glass while being subjected to ultrasonic vibrations. The subject patent teaches that the impartation of such ultrasonic vibrations to the cutting wheel results in a deeper score. The reference deals only with imposing and deepening a conventional, surface-damaging score and does not address the problem of initiating a damage-free score.

U.S. Pat. No. 3,532,260 to Augustin et al. teaches a method of cutting glass wherein a conventional scoring tool imposes a surface-damaging score in the work piece, which is subsequently opened by applying vibratory energy adjacent the score. The subject patent teaches that sonic or ultrasonic transducers may be utilized to provide the vibratory energy. This reference also deals only with imposing and opening a conventional, surface-damaging score.

U.S. Pat. Nos. 3,865,293; 3,865,673; 3,979,243; 4,057,184; and 4,213,550 each teach techniques for imposing scores in refractory materials such as ceramics, glass, and glass ceramics which do not damage the surface of the work piece. Such damage-free scores are generally known as subsurfacce scores and/or pseudosubsurface scores. The term "subsurface score" as used herein is defined as an essentially spall or wing-free discontinuity or fissure such as an intentionally induced crack or score that is within the thickness of the refractory piece and extends substantially perpendicular to its major surfaces but does not extend to or connect either major surface of the piece. The term "pseudosubsurface score" as used herein is defined as an intentionally induced discontinuity or fissure in a piece of refractory material that extends substantially perpendicular to its major surfaces, that does not appear itself to extend or connect to either major surface, but which is accompanied by a microscopic zone of damage essentially spall or wing-free which extends between its tip and the major surface of the piece.

The advantage of imposing a damage-free score in a refractory piece to sever same is that the resultant severed edge is essentially in a pristine condition, having essentially maximum edge strength. As taught in U.S. Pat. No. 3,979,243, such a damage-free score is initiated at a zone of surface damage. The zone of surface damage as taught therein is imposed in the refractory piece by applying an initial force to the scoring wheel which is approximately 20% greater than the selected scoring force, or by initially impacting the surface of the piece to be scored with a force of about 20% greater than the selected scoring force.

U.S. Pat. No. 4,057,184 teaches that a zone of surface damage is generated by tapping the surface of the piece to be scored with a rigid object; impacting the surface of the piece with a scoring wheel; or rotatably urging the scoring wheel against the surface of the piece. The above-described techniques of initiating a damage-free score are acceptable when the refractory material is stationary. However, when the refractory piece is moving, e.g., as in a moving glass ribbon, such techniques may be unacceptable if they require that the scoring wheel be manually tapped or rotated to initiate the score. As can be appreciated, acting on the scoring wheel as it is powered by a glass ribbon moving at speeds of up to 600 inches per minute (15 meters per minute) may be hazardous.

U.S. Pat. No. 4,213,550 teaches a method of initiating a damage-free score in a continually moving refractory piece, by imposing a zone of damage on the surface of the piece with a pointed stylis or conventional scoring wheel and thereafter moving the zone of damage downstream through aligned damage-free scoring facilities to initiate the damage-free score. Although satisfactory, such a technique requires discrete surface damaging facilities upstream of and in precise alignment with the damage-free scoring facilities in order to impose the requisite zone of damage on the surface of the piece. It would be advantageous to have a method of initiating a damage-free score which does not require separate facilities for imposing a zone of surface damage before imposing the damage-free score in the refractory piece, and which avoids the limitations in the prior art.

SUMMARY OF THE INVENTION

The present invention provides a method of and apparatus for imposing a damage-free score in a piece of refractory material which may be utilized on a continually moving refractory piece without the need for discrete upstream surface damaging facilities. The method of the present invention includes the steps of biasing scoring facilities against the surface of the refractory piece with a biasing force sufficient to propagate a damage-free score within said refractory piece but insufficient to initiate a damage-free score therein in the absence of an underlying zone of surface damage; imparting vibrations to the scoring facilities to oscillate the scoring facilities while they are in contact with the refractory piece; and moving the refractory piece and the scoring facilities with respect to one another to impose a damage-free score in the refractory piece. It has been learned that such a method may be advantageously utilized to controllably initiate damage-free scores, and/or may be utilized to increase the depth of a damage-free score imposed in a refractory piece. When utilized solely to initiate a damage-free score, the vibration imparting step of the present invention is practiced for a short time period, e.g., 1 second, to initiate a damage-free score, and may thereafter be terminated while the damage-free score is propagated within the piece by the biasing and moving steps. In this manner, a damage-free score may be conveniently imposed in a continually moving refractory piece without the need for discrete surface damaging facilities.

As previously mentioned, the method of the present invention may also be utilized to increase the depth of a previously initiated damage-free score, by the continual practice of the vibration imparting step during the biasing and moving steps. Increasing the depth of the damage-free score may be beneficial when practiced with relatively thick refractory pieces, e.g., greater than about ⅜ inch (0.96 cm.), thereby decreasing the bending moment required to subsequently open the score.

BRIEF DESCRIPTION OF THE FIGURES

FIG. 1 is a plan view of a glass ribbon conveyor system having ribbon scoring facilities incorporating features of the present invention.

FIG. 2 is a side elevated view of the conveyor system shown in FIG. 1.

DESCRIPTION OF THE INVENTION

Figure 3:
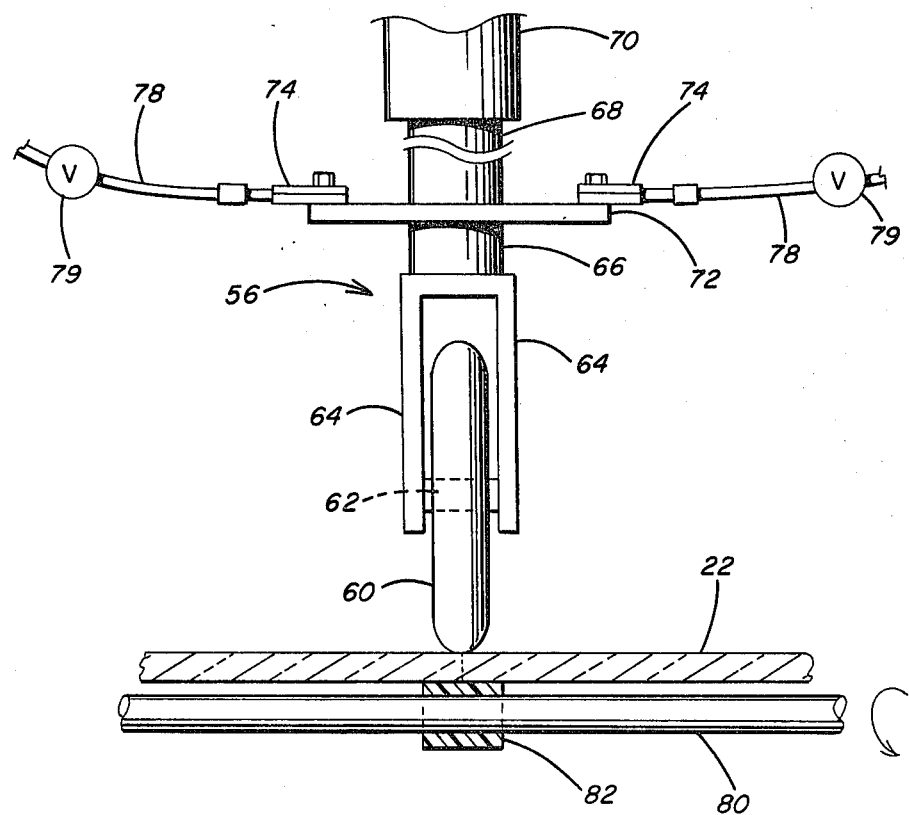
FIG. 3 is a view taken along line 3—3 of FIG. 1, showing a ribbon scoring facility for initiating and imposing a damage-free score in a moving ribbon in accordance with the teaching of the present invention.

FIGS. 1 and 2 show a glass ribbon conveyor system 20 of the type used in the art for advancing a glass piece, e.g., glass ribbon 22, in the direction of arrow 24 along a movement path through a scoring station 26 incorporating features of the present invention. The scoring station 26 includes a longitudinal scoring station 28 for imposing longitudinal damage-free scores 30, 32, 34, and 36 in the ribbon 22 adjacent the edges thereof in a manner to be discussed below, and a lateral scoring station 38 for selectively imposing lateral scores 40, e.g., transverse to the ribbon movement path.

The lateral scoring station 38 is not limiting to the invention and may be any of the types used in the art for imposing a conventional lateral score. The term "conventional score" as used herein is defined as a score or fracture extending from a major surface of the piece into the thickness of the piece. In general, the lateral scoring station 38 includes a bridge 42 mounted above and transverse to the ribbon movement path 24. A scoring assembly 44 powered by motor 46 moves along the bridge 42, preferably at an oblique angle to the ribbon movement path 24 so that score lines 40 are generally perpendicular to the direction of the movement path 24. A bridge arrangement that may be used in the practice of the invention, but not limiting thereto, is taught in U.S. Pat. No. 3,244,337, which teachings are thereby incorporated by reference. The location of the lateral scoring station 38 relative to the longitudinal scoring station 28 is not limiting to the present invention, as it may be located either upstream or downstream therefrom.

With continued reference to FIGS. 1 and 2, the longitudinal scoring station 28 includes a plurality of scoring devices 50, 52, 54, and 56 mounted above the movement path 24 on a bridge 58. The bridge 58 is not limiting to the invention and may be of the types known in the art. Scoring devices 50, 52, 54, and 56 are of a type capable of initiating and imposing a damage-free score in the glass ribbon 22, and will be discussed more fully hereinafter. Preferably the positions of devices 50, 52, 54, and 56 are adjustable along the bridge 58 relative to one another so that longitudinal scores 30, 32, 34, and 36 may be conveniently spaced.

Referring to FIG. 3, there is shown the scoring device 56 incorporating features of the present invention and intended to be exemplary of devices 50, 52 and 54, including a scoring wheel 60 rotatably mounted by an axle 62 to the bifurcated end 64 of a wheel holder 66. The wheel holder 66 is mounted at its opposite end in any convenient manner to a piston rod 68 of an air cylinder 70, which serves to raise, to lower and to bias the scoring wheel 60 against the ribbon 22. A rigid bar 72 is conveniently mounted to the upper end of the wheel holder 66, and has a pair of air vibrators 74 mounted thereto. The air vibrators 74 each communicate with a source of pressurized air, e.g., a tank 76, (shown only in FIGS. 1 and 2) through air lines 78 and valves 79, which control the activation and frequency of vibration thereof. The air vibrators 74 shown in FIG. 3 may be B-D-10 air vibrators available from Vibro Vibration Products, Inc. of Wyoming, R.I.

A rotatable shaft 80 is preferably mounted under the glass ribbon 22 with an upraised portion or support land 82 positioned directly below the position of the scoring wheel 60 to provide support to the ribbon 22 when the scoring wheel 60 is biased thereto to impose a damage-free score 36.

The scoring wheel 60, wheel holder 66, and air cylinder 70 utilized in the practice of the present invention may be of the type known in the art for imposing damage-free scores; for example, those taught in U.S. Pat. Nos. 3,865,293; 3,865,673; 4,027,562; 4,057,184; 4,102,227; 4,137,803; or 4,213,550, which teachings are hereby incorporated by reference. Preferably the scoring wheel 60 is of the type having an arcuate scoring surface as taught in U.S. Pat. No. 4,057,184 and as shown in FIG. 3. A preferred air cylinder 70 for use in the present invention may be obtained from the Miller Fluid Power Corp. of Bensenville, Illionis as Model DA74B. Of course the invention is not limited to the use of an air cylinder, as control of the vertical position and scoring load of the scoring wheel 60 may be alternately accomplished with hydraulic cylinders or electrical motors.

Figure 4:
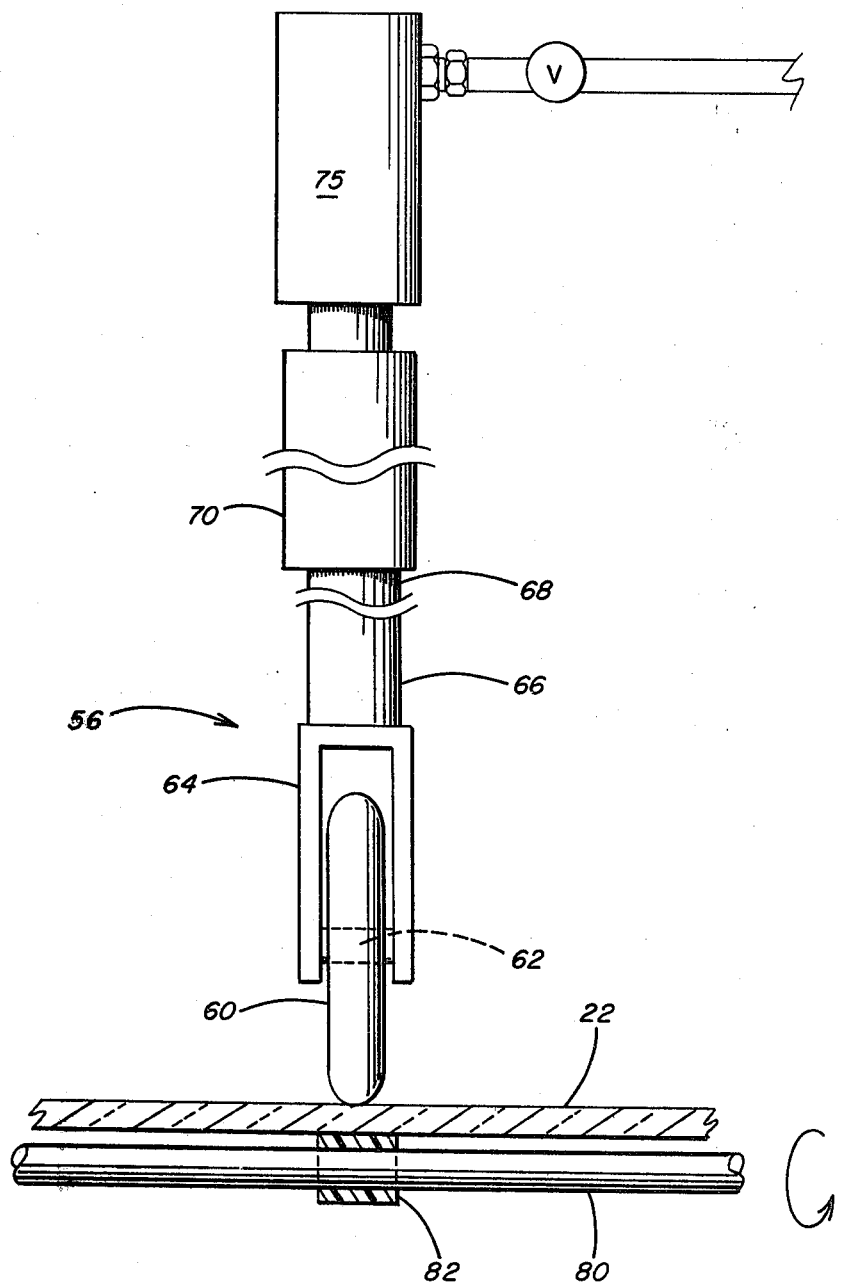
FIG. 4 is a view similar to FIG. 3 of an alternate embodiment of an apparatus incorporating features of the present invention.

With reference to FIG. 4, there is shown an alternate embodiment of the present invention, wherein the elements discussed in relation to FIG. 3 are retained, except for rigid bar 72 and the pair of air vibrators 74. In their place is employed a single low frequency air vibrator 75, conveniently mounted to the upper end of the piston rod 68 of air cylinder 70. Such an air vibrator 75 is available from Vibco, Inc., of Wyoming, R.I.

It will be appreciated by one skilled in the art that the present invention is not limited to the use of air vibrators, however, as alternate mechanical and electrical facilities are available to impart vibrations to the scoring wheel 60 in accordance with the present invention. As used herein, the term "vibration" is defined as a repetitive, substantially uniform amplitude, oscillatory motion occurring for a controllable period of time. According to the present invention, vibrations are preferably imparted by the air vibrators 74 or 75 to the scoring wheel 60 at less than ultrasonic frequencies, e.g., 500 cycles per minute, to initiate a damage-free score, as will be more fully discussed below.

In a first mode of operation according to the present invention, a glass ribbon 22, preferably free of zones of surface damage, is conveyed along movement path 24 under bridge 58, at which point it is engaged between scoring wheels 60 and support lands 82 of scoring devices 50, 52, 54, and 56. Air cylinders 70 are actuated to provide a biasing load upon the glass ribbon 22 between scoring wheels 60 and support lands 82 of a magnitude which is insufficient to damage the surface of the glass ribbon 22, but which is sufficient to cause the imposition of a damage-free score therein if the scoring wheels 60 engage a zone of surface damage. The scoring wheels 60 are preferably sized and loaded as taught in U.S. Pat. No. 4,057,184. In this manner, a glass ribbon 22 free of surface damages is able to pass unscored under bridge 58, if such is desired. When longitudinal scoring is desired, air vibrators 74 or 75 are activated, thereby transmitting vibrations, e.g., at less than ultrasonic frequencies, to the loaded scoring wheels 60, which in turn create zones of surface damage on ribbon 22. Each zone of surface damage then serves to initiate a damage-free score within the ribbon 22 which continues to be imposed as long as the scoring wheel 60 is maintained at the preferred biasing load. After the damage-free score is initiated, the air vibrators 74 or 75 may be deactivated without jeopardizing the continued propagation of the damage-free score in ribbon 22, for the selected biasing load is of a sufficient magnitude to continue the imposition of the damage-free score, one such is initiated.

As shown in FIG. 1, it is preferred that scoring devices 50 and 52 be positioned adjacent one another and adjacent the marginal edge 84 of ribbon 22, while scoring devices 54 and 56 are positioned in a similar manner adjacent the opposite marginal edge 86 of ribbon 22. In this manner, a pair of outermost longitudinal scores 30 and 36 and a pair of inner longitudinalscores 32 and 34 are provided adjacent the edges 84 and 86 of the ribbon 22.

The ribbon 22 moves downstream from the longitudinal scoring station 28 to the lateral scoring station 38, are lateral scores 40 are imposed in the ribbon 22. Thereafter, the ribbon 22 passes downstream through a series of score opening stations (not shown) where, sequentially, the lateral scores 40 are opened, the outermost longitudinal scores 30 and 36 are opened, and the inner longitudinal scores 32 and 34 are opened. The sequential opening of the outermost and then the inner longitudinal scores provides a preferred pristine edge to the ribbon 22, but is not limiting to the present invention.

If a break or gap occurs in the ribbon 22 which approaches the longitudinal scoring station 28 from the upstream direction, the air cylinders 70 may be actuated to raise the scoring wheels 60 until the break or gap has passed thereunder, and thereafter may be actuated to lower the scoring wheels 60 and re-establish the preferred biasing load. Damage-free scoring can then be initiated, as desired, by the activation of the air vibrators 74 or 75. In this manner complete control over the initiation of damage-free scoring is accomplished with a single facility.

In addition to the previously discussed method of initiating a damage-free score, it has been determined that continued activation of the air vibrators 74 or 75 during damage-free scoring has the effect of increasing the depth of the damage-free score which is imposed in the ribbon 22. Such a mode of operation may be particularly beneficial when used with relatively thick work pieces, e.g., greater than about ⅜ inch (0.95 cm.), where a deeper damage-free score will facilitate subsequent score opening procedures. Damage-free score depths which may be realized by the practice herein disclosed may be generally between 10% and 30% in excess of the depths realized in the absence of continual activation of the air vibrators 74 or 75. It has been noted that while the quality of the damage-free score is detrimentally affected to a slight extent when its depth is increased in the manner described, the overall quality of edge remains acceptable.

EXAMPLE I

With respect to the embodiment of the invention shown in FIGS. 1, 2, and 3, a one-half inch (1.27 cm.) thick glass ribbon was positioned on a conveyor system 20 beneath a longitudinal scoring station 28. A 4.0 inch diameter (10 cm.) subsurface scoring wheel 60 was biased against the upper surface of the ribbon with a biasing force of about 30 pounds per square inch (p.s.i.). An undamaged portion of the ribbon was conveyed along the movement path between the scoring wheel 60 and the scoring land 82 without having a damage-free score imposed therein. Thereafter, while the ribbon continued to be conveyed and while the biasing force was maintained, the air vibrators 74 were actuated with a pressure of about 20 p.s.i., thereby imparting vibrations of about 500 cycles per minute to the scoring wheel 60. Air vibrators 74 were maintained in operation for about one second and thereafter deactivated. A damage-free score initiated within the ribbon at a point corresponding to the actuation point of the air vibrators 74, and continued to be propagated within the ribbon by the scoring wheel 60 after the air vibrators 74 were deactivated. Measurements indicated that a damage-free score having a depth of about 0.120 inch (0.3 cm) was imposed in the ribbon.

EXAMPLE II

A damage-free score was initiated as in Example I, but the air vibrators 74 were maintained in operation continually after their initial activation. A damage-free score having a depth between about 0.140 inch (0.36 cm.) and about 0.167 inch (0.42 cm.) was imposed in the ribbon.

I claim:

1. A method of imposing a damage-free score in a piece of refractory material, comprising the steps of:

biasing damage-free scoring means against the surface of said piece of refractory material with a biasing force sufficient to propogate a damage-free score therein but insufficient to initiate a damage-free score therein in the absence of an underlying surface defect;

imparting vibrations to said scoring means to oscillate said scoring means while practicing said biasing step to create a surface defect in said refractory piece capable of generating a damage-free score therein; and moving said refractory piece and said scoring means relative to one another while practicing said biasing step to propogate said damage-free score within said piece of refractory material extending from the surface defect created by the imparting step.

2. A method of imposing a damage-free score in a piece of refractory material, comprising the steps of:

biasing damage-free scoring means against the surface of said piece of refractory material with a biasing force sufficient to propogate a damage-free score therein but insufficient to initiate a damage-free score therein in the absence of an underlying zone of surface damage;

imparting vibrations to said scoring means to oscillate said scoring means while practicing said biasing step to damage the surface of said refractory piece to initiate a damage-free score within said refractory piece;

moving said refractory piece and said scoring means relative to one another while practicing said biasing step to propogate said damage-free score within said piece of refractory material; and discontinuing the practice of said vibration imparting step after the practice of said moving step begins the propogation of said damage-free score within said refractory piece.

3. A method of imposing a damage-free score in a piece of refractory material, comprising the steps of:

biasing damage-free scoring means against the surface of said piece of refractory material with a biasing force sufficient to propogate a damage-free score therein but insufficient to initiate a damage-free score therein in the absence of an underlying surface defect;

imparting vibrations to said scoring means to oscillate said scoring means while practicing said biasing step to create a surface defect in said refractory piece capable of generating a damage-free score therein; thereafter maintaining the biasing force on the scoring means; while maintaining the vibrations of the scoring means; while moving said refractory piece and said scoring means relative to one another, wherein said step of maintaining the biasing force while practicing said moving step propogates the damage-free score initiated by said biasing and imparting steps and said step of maintaining the vibrations while practicing said moving step deepens the damage-free score.

4. The method as set forth in claim 2 or 3 wherein said vibrations are imparted to said scoring means normal to the surface of said refractory piece.

5. The method as set forth in claim 4 wherein said vibrations are imparted to said scoring means at less than ultrasonic frequencies.

6. The method as set forth in claim 5 wherein said refractory material is a piece of glass.

7. The method as set forth in claim 6 wherein said piece of glass is a ribbon of glass and wherein said moving step is practiced upon said ribbon of glass.

8. Apparatus for imposing a damage-free score in a piece of refractory material, comprising:

scoring means capable of imposing a damage-free score in said piece of refractory material;

means for biasing said scoring means against a surface of the piece of refractory material with a biasing force sufficient to propogate a damage-free score therein but insufficient to initiate a damage-free score therein in the absence of an underlying surface defect;

means for imparting vibrations to said scoring means when said scoring means contacts said piece of refractory material to create a surface defect for initiating a damage-free score;

means for moving said piece of refractory material and said scoring means relative to one another when the scoring means is biased against the piece by said biasing means to propogate said damage-free score; and means for selectively acting on said imparting means to maintain propogation of said damage-free score.

9. The apparatus as set forth in claim 8 further comprising:

means for actuating said deactuating said vibration imparting means.

10. The apparatus as set forth in claim 8 wherein said vibration imparting means comprises:

means for imparting vibrations at less than ultrasonic frequencies to said scoring means.

11. The apparatus as set forth in claim 10 wherein said scoring means comprises:

a rotatable scoring wheel.

12. The apparatus as set forth in claim 11 wherein said scoring means further comprises:

a scoring land biasable against the surface of said piece of refractory material opposite of the position of said scoring wheel.

13. The apparatus as set forth in claim 12 wherein said scoring wheel has an arcuate scoring surface.

* * * * *